Aug. 26, 1952 J. C. MYERS 2,608,650

RADIO SIGNAL ENHANCING FREQUENCY CONVERSION METHOD

Filed Sept. 1, 1943

Inventor

Jacob C. Myers

By W. Glen Jones

Attorney

Patented Aug. 26, 1952

2,608,650

UNITED STATES PATENT OFFICE 2,608,650

RADIO SIGNAL ENHANCING FREQUENCY CONVERSION METHOD

Jacob C. Myers, Wake Forest, N. C.

Application September 1, 1943, Serial No. 500,781

7 Claims. (Cl. 250—20)

(Granted under the act of March 3, 1883, as amended April 30, 1928; 370 O. G. 757)

This invention relates to a signal enhancer and primarily to means and methods of increasing the amplitude and frequency sensitivity of electric wave detectors.

In conventional heterodyne detectors, it is common to choose the frequency (F) of the local or heterodyne frequency oscillator equal to the input signal ($f$) plus or minus the detector output frequency ($f_0$). Thus, in such circumstances, if two input signals are supplied to the input terminals, which signals are separated by a particular number of cycles ($\Delta f$), the output signals will also be separated by the same number of cycles.

The conventional system just described is not satisfactory in some applications and it is often found very desirable to effect a further differentiation or separation between wanted and unwanted signals. The present invention is designed to accomplish this by increasing such difference frequency ($\Delta f$), such that the output signals are separated by some integer multiple (greater than 1) of the difference frequency, $\Delta f$. This obviously enables the wanted and unwanted signals to be more easily distinguished or separated by some conventional means, such as a filter.

Additionally, there are some applications, as for example, sound-ranging systems where it is of utmost importance to distinguish easily and positively between two signals whose frequencies lie very close together, although such frequencies may or may not be in the receiver simultaneously. For instance, in such systems, relative movement of the projector and target causes the received frequency to be shifted by some small amount with respect to the transmitted frequency by virtue of the well-known Doppler effect. Thus, depending upon whether the distance between projector and target is increasing or decreasing, the echo frequency will be lower or higher than the transmitted frequency. Since this Doppler shift may be very small, means for increasing it proves most valuable in its identification.

The invention is also so arranged that amplitude differences between signals are likewise increased by virtue of the power law in a relationship produced by the fact that the amplitude of the output at a given frequency is proportional to a power of the input corresponding to the order of the frequency difference multiplication.

In general, these advantages are accomplished by using a detector comprising a configuration of non-linear elements, balanced in such a manner that the output contains substantially no component of the original frequencies. This, of course, may not be necessary where only one input signal is of interest, as will be shown. In any case, the invention is practiced most simply by choosing the frequency F of the local oscillator at $n$ times (where $n$ equals some integer, other than 1) the frequency of the input signal $f$, plus or minus the desired output frequency $f_0$. Very substantial improvements in operation of the detector will take place because the output of the local oscillator beats with the $n$th harmonic of the input frequency to effectively multiply the difference frequency $\Delta f$ by $n$. Obviously, such separation is of great assistance in selecting and identifying the desired frequency.

Figure 1:
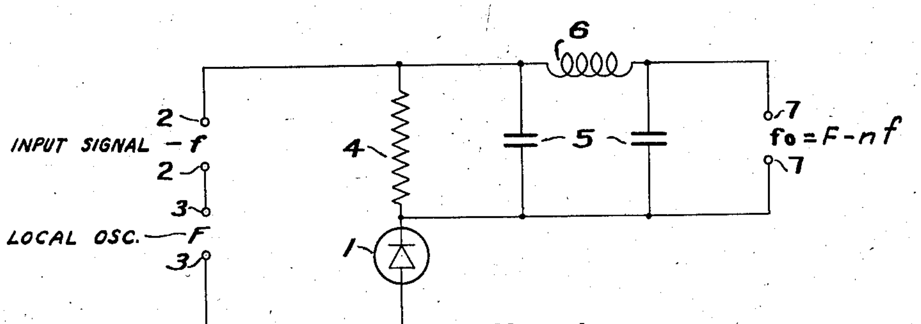
Figure 1 is a schematic drawing of a particular application of the invention.

The operation of the invention described above can best be explained mathematically. For instance, it can easily be shown that detector output frequencies ($f_0$) can be represented by the following general equation.

$$f_0 = mF \pm nf \qquad (1)$$

where F is the frequency of the local oscillator, $f$ is the input frequency, and $m$ and $n$ are any integers.

By proper choice of the detector (that is, if it is balanced as described above), the output can be restricted to beats between F and $f$ and no beats between the several input frequencies will be in the output. Thus it is only necessary to analyze Equation 1 for such individual input frequencies and it is not necessary to consider the simultaneous application of several input frequencies.

For the proposed type of operation, it is convenient to choose detector operation such that $m$ is equal to unity. In this case, Equation 1 becomes $$f_0 = F \pm nf \qquad (2)$$

where $n$ is some integer greater than 1. From Equation 2 it is immediately apparent that if the input frequency $f$ is increased by an amount $\Delta f$, the new output frequency $f_0'$ for such input is given by the equation $$\begin{aligned} f_0' &= F \pm n(f + \Delta f) \\ &= F \pm nf \pm n\Delta f \end{aligned} \qquad (3)$$

Substituting from Equation 1

$$f_0'=f_0\pm n\Delta f \quad (4)$$

Thus, an increase in the input frequency in an amount $\Delta f$ causes an increase in output frequency of an amount $n\Delta f$.

For example, suppose that it is desired to double the frequency difference between two signals; and further, that when the input signal is equal to 20 kc., an 800 cycle audio beat is wanted at the output. Then by Equation 2, the local oscillator frequency (in kc.) is $$F=f_0\mp nf$$
$$=.8\mp 2\cdot 20$$
$$=.8\mp 40$$

Under these circumstances, if the input signal should change by 200 cycles so that the new input frequency equalled 20.2 kc., the new output frequency, $f_0'$, is given by Equation 4

$$f_0'=f_0\pm n\Delta f$$
$$=.8\pm 2\cdot .2$$
$$=.8\pm .4$$

Thus, although the input signal increased by only .2 kc., the output signal increased by twice that amount, or .4 kc. Similarly, it may be shown that if $n$ is taken equal to any integer as 3, 4, 5 . . . $n$, the output frequency will be changed by an amount 3, 4, 5 . . . $n$ times the amount of input frequency change.

A more complete mathematical analysis of effects which are made use of in the present invention is included in Everitt's Communication Engineering, Chap. XIII. For example on page 379 Everitt states, "—when only terms up to the squared one in Taylor's series are of importance, the sum and difference frequencies in the output have intensities which are proportional to the product of the intensities of the two frequencies that produce them." Similarly it is apparent from a study of an expansion of Taylor's series that the modulation frequencies in the output have intensities proportional to the products of the frequencies that produce them. This is stated as the Fundamental Principle of Modulation in Everitt (page 393), and treated throughout the remainder of Chapter XIII with respect to higher order modulation and demodulation products.

From the same reference, it will be clear that the amplitude of the output signal will be proportional to the $n$th power of the desired input signal, where $n$ is defined as described above. Thus where $n$ is chosen as 2, the output amplitude will be proportional to the input amplitude squared, when $n$ is 3, it will be proportional to the input amplitude cubed, etc. Thus, in addition to the desirable frequency effects, the invention provides a convenient means for distinguishing the desired signal by virtue of the power law characteristic of the amplitude. For example, if the ratio of the amplitudes of the incoming desired and undesired signal is $r$, the corresponding ratio in the output will be equal to $r^n$.

In echo-ranging applications, noticeable improvement in the signal to noise (reverberation) ratio may well be due to this latter effect. If it be assumed, for instance, that reverberation is made up of many frequencies, each of which has a fractional amplitude as compared with the amplitude of the signal, the effect is to reduce each frequency component by the $n$th power of its original fractional amplitude. Although the root mean square value of the original reverberation may have been greater than the original signal, its ultimate effective amplitude will be materially reduced with respect to that of the signal.

The invention is not limited in application to the use of any particular circuit arrangement, nor to any particular type of detector. Any conventional type of detector can be utilized, as will be obvious to those skilled in the art.

With reference to the various circuit arrangements, several typical ones of which are illustrated in the drawings, it can be said that in all cases the local oscillator frequency (which is made nearly equal to some integral multiple of the input frequency) beats with the corresponding harmonic of the input frequency to produce the desired output frequency. In some circuit arrangements, it is found that both odd and even multiples can be utilized in the same circuit; while in others, it may be found that operation can be obtained only with odd or even multiples. For any particular application, the circuit must be chosen such that the desired multiple is obtained.

It should also be noted that although some circuits discriminate against particular multiples, these can still be used because the discrimination is not perfect, the circuits normally not being exactly balanced.

One form of the invention is shown in Fig. 1 in which a single element detector 1 is connected in series with input terminals 2 and local oscillator terminals 3. The output is taken off across resistor 4 and filtered by means of the filter, comprising condensers 5 and inductance 6, and supplied at terminals 7. The purpose of the filter is to insure supplying only the difference frequencies to terminals 7. In most applications, as described, this will be an audio frequency of $F-nf$. This particular circuit may not be utilized for the separation of two input frequencies, but serves quite satisfactorily for applications such as was described with respect to the Doppler effect in echo-ranging gear.

Figure 2:
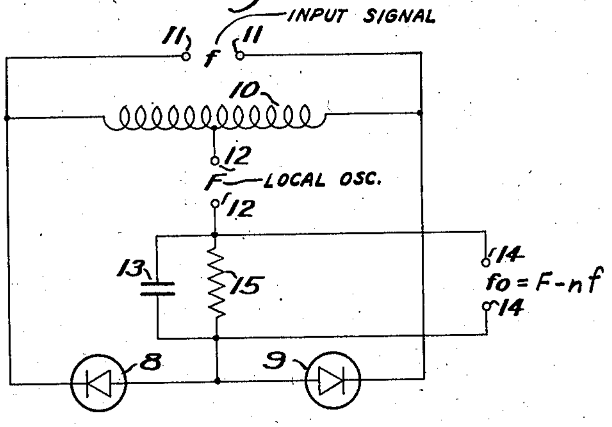
Figure 2 is a schematic drawing of another form of the invention which may be used to increase selectivity between two input signals.

Figure 2 illustrates another possible application in which two input signals may be separated, but only if $n$ is chosen as some odd integer. Here, two detectors 8, 9 are used, connected in the manner of a full-wave rectifier with the input supplied across inductance 10 at terminals 11. The local oscillator terminals 12 are connected in series with resistor 15 and the output is taken out at terminals 14 across such resistor, capacitor 13 providing a low impedance path for the signal frequencies and serving the same purpose as the filter in Fig. 1. This arrangement will not operate effectively, as has been said, where $n$ is an even integer, so that it will enable the difference frequency between input signals to be increased only by 1, 3, 5, 7, etc. times.

Figure 3:
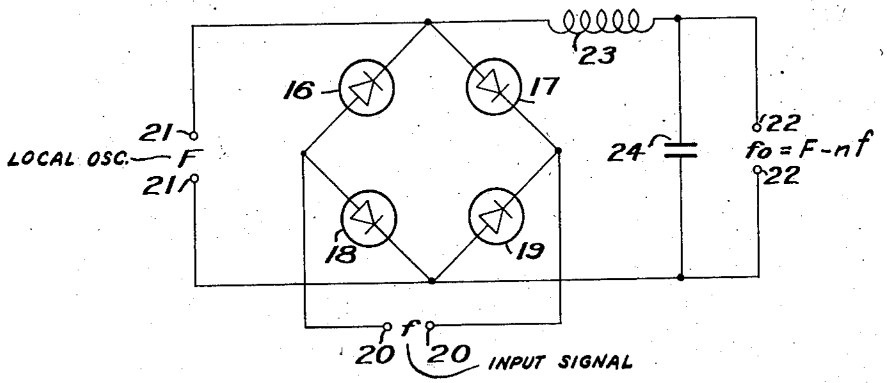
Figure 3 is a schematic drawing of still another general application of the invention which may be used in all cases.

If it is desired to have one circuit perform under all conditions, where $n$ is either odd or even, the balanced configuration of non-linear elements shown in Fig. 3 is very convenient. Here four elements, 16, 17, 18, 19 are connected to form a balanced detector. The input and local oscillator frequencies are supplied at terminals 20, 21, respectively, at opposite corners of the balanced configuration, and the output is supplied to terminals 22, after having been filtered by the filter comprising inductance 23 and capacitor 24. In this circuit, both odd and even harmonics of the input beat with the local oscillator frequency so that $n$ may be chosen as either odd or even. See an article, "Copper Oxide Modulators in Carrier Telephone Systems," by R. S. Caruthers, The Bell System Technical Journal, April 1939, pages 315–317.

In all of the above cases, the filter circuits are chosen as illustrative and any other conventional arrangement may be used.

In most cases the choice of position of the invention in the existing sound-ranging or other equipment is one of convenience. It may be arranged as a supplement to the existing units with the detector and oscillator operating on the signal before it is fed into the receiver, or incorporated into it by simply altering the frequency of beat frequency oscillators which are a part of the present systems.

The invention described herein may be manufactured and used by or for the Government of the United States of America for governmental purposes without the payment of any royalties thereon or therefor.

Having described my invention, I claim:

1. A method of enhancing the frequency deviation of a signal frequency comprising the steps of receiving said signal frequency, generating a fixed frequency differing by a preselected output frequency from an integral multiple greater than one of said signal frequency, mixing the signal frequency and said fixed frequency and deriving said preselected output frequency, said output frequency having a frequency deviation corresponding to that of the received signal multiplied by an amount equal to the integral multiple selected for use.

2. In the method described in claim 1, said integral multiple taken equal to 2 and said preselected output frequency being an audio frequency.

3. A method of signal selection comprising the steps of receiving two input signals of different frequencies, generating a fixed frequency differing by a preselected output frequency from an integral multiple greater than one of a first of said signal frequencies, mixing the two signal frequencies and the fixed frequency and deriving said preselected output frequency, said output frequency having a frequency deviation corresponding to that of said first input signal multiplied by an amount equal to the integral multiple selected for use.

4. In the method described in claim 3, said integral multiple taken equal to two, and said preselected output frequency being an audio frequency.

5. A method of signal selection comprising the steps of receiving a plurality of signals of different frequencies, generating a fixed frequency differing by a preselected output frequency from an integral multiple greater than one of a first of said signal frequencies, mixing the signal frequencies and the fixed frequency, and selecting said preselected output frequency corresponding to said first signal frequency while rejecting the output frequencies corresponding to the others of said plurality of signals, said plurality of output frequencies differing by an amount equal to the difference between the corresponding input signals multiplied by said integral multiple.

6. A method of enchancing the selective properties of a transducer comprising the steps of receiving a signal frequency, generating a fixed frequency differing by a preselected output frequency from an integral multiple greater than one of said signal frequency, mixing the received signal frequency and the fixed frequency, and deriving an output signal of said preselected frequency having an amplitude which is related to the amplitude of the corresponding input signal in accordance with an exponential law of order corresponding to said integral multiple.

7. A method of signal selection comprising the steps of receiving a plurality of signals of different frequencies of slightly differing amplitudes, generating a fixed frequency differing by a preselected output frequency from an integral multiple greater than one of a first of said signal frequencies, mixing the signal frequencies and the fixed frequency and selecting the output signal of said preselected frequency corresponding to said first signal frequency while rejecting the output signals corresponding to the other signal frequencies, said output signals having an amplitude difference which is greater than said amplitude difference of said input signals.

JACOB C. MYERS.

REFERENCES CITED

The following references are of record in the file of this patent:

UNITED STATES PATENTS

| Number | Name | Date |
|---|---|---|
| 1,420,055 | Nichols | June 20, 1922 |
| 1,699,570 | Potter | Jan. 22, 1929 |
| 1,802,760 | Gage | Apr. 28, 1931 |
| 1,813,923 | Heising | July 14, 1931 |
| 1,920,238 | Black | Aug. 1, 1933 |
| 2,086,601 | Caruthers | July 13, 1937 |
| 2,140,526 | Haffcke | Dec. 20, 1938 |

OTHER REFERENCES

Everitt: Communication Engineering (2nd edition), 1937, pages 398–403. (Copy in Div. 51.)